(12) United States Patent
Sinitskii et al.

(10) Patent No.: US 10,908,108 B2
(45) Date of Patent: Feb. 2, 2021

(54) CARBON NANOSTRUCTURE BASED GAS SENSORS AND METHOD OF MAKING SAME

(71) Applicant: NUtech Ventures, Lincoln, NE (US)

(72) Inventors: Alexander Sinitskii, Lincoln, TX (US); Andrey Vitalyevich Lashkov, Kamyshin (RU); Mohammad Mehdi Pour, Lincoln, NE (US); Alexey Lipatov, Lincoln, NE (US); Mikhail Shekhirev, Lincoln, NE (US); Victor Vladimirovich Sysoev, Saratov (RU)

(73) Assignee: The Board of Regents of the University of Nebraska, Lincoln, NE (US)

( * ) Notice: Subject to any disclaimer, the term of this patent is extended or adjusted under 35 U.S.C. 154(b) by 199 days.

(21) Appl. No.: 16/121,328

(22) Filed: Sep. 4, 2018

(65) Prior Publication Data
US 2019/0079041 A1    Mar. 14, 2019

Related U.S. Application Data

(60) Provisional application No. 62/548,729, filed on Aug. 22, 2017.

(51) Int. Cl.
*G01N 27/12* (2006.01)
*C01B 32/186* (2017.01)
*C01B 32/158* (2017.01)

(52) U.S. Cl.
CPC ......... *G01N 27/127* (2013.01); *C01B 32/186* (2017.08); *C01B 32/158* (2017.08)

(58) Field of Classification Search
CPC .... C01B 32/158; C01B 32/186; G01N 27/127
See application file for complete search history.

(56) References Cited

U.S. PATENT DOCUMENTS

| 2003/0185741 | A1* | 10/2003 | Matyjaszewski | ..... C01B 32/162 423/445 R |
| 2005/0053525 | A1* | 3/2005 | Segal | ................. G01N 27/4146 422/88 |

(Continued)

OTHER PUBLICATIONS

Shumao Cui et al., "Decoration of vertical graphene with aerosol nanoparticles for gas sensing." Journal of Physics D: Applied Physics, Apr. 2015.

(Continued)

*Primary Examiner* — Francis C Gray
(74) *Attorney, Agent, or Firm* — Leydig, Voit & Mayer, Ltd.; Gerald T. Gray

(57) ABSTRACT

A gas sensor includes a sensing element including a substrate and a layer of carbon based nanostructures arranged on a surface of the substrate, wherein the carbon based nanostructures are arranged substantially perpendicular (e.g., at angles larger than 0 degrees) to the surface of the substrate, and wherein intercalation of a gas analyte between the carbon based nanostructures changes a conductivity of the layer of carbon-based nanostructures. The carbon-based nanostructures may include graphene nanoribbons (GNRs), laterally extended graphene nanoribbons (eGNRs), GNRs that comprise straight graphene nanoribbons, polycyclic aromatic hydrocarbons, or other graphene-based and graphene-related materials.

24 Claims, 11 Drawing Sheets

(56) References Cited

U.S. PATENT DOCUMENTS

| | | | |
|---|---|---|---|
| 2009/0084162 A1* | 4/2009 | Besnard | G01N 27/127 73/31.06 |
| 2010/0056819 A1* | 3/2010 | Jang | B82Y 30/00 556/478 |
| 2011/0085939 A1* | 4/2011 | Salemme | B82Y 30/00 422/68.1 |
| 2012/0135224 A1* | 5/2012 | Guzman de Villoria | B82Y 40/00 428/323 |
| 2012/0213986 A1* | 8/2012 | Kowalewski | H01B 1/18 428/304.4 |
| 2013/0344390 A1* | 12/2013 | Chen | C01B 32/23 429/231.8 |
| 2016/0161196 A1* | 6/2016 | Lashmore | F28F 13/00 165/135 |
| 2018/0368743 A1* | 12/2018 | Lin | A61B 5/14539 |
| 2019/0056362 A1* | 2/2019 | Morgan | G01N 27/12 |
| 2019/0204265 A1* | 7/2019 | Stowell | C01B 32/182 |

OTHER PUBLICATIONS

Kehan Yu et al., "Patterning Vertically Oriented Graphene Sheets for Nanodevice Applications." The Journal of Physical Chemistry Letters, Feb. 2011.

* cited by examiner

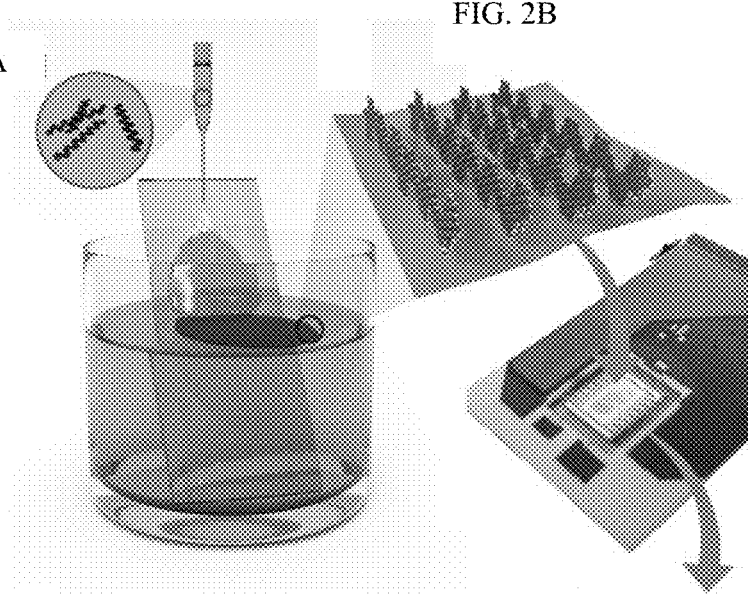
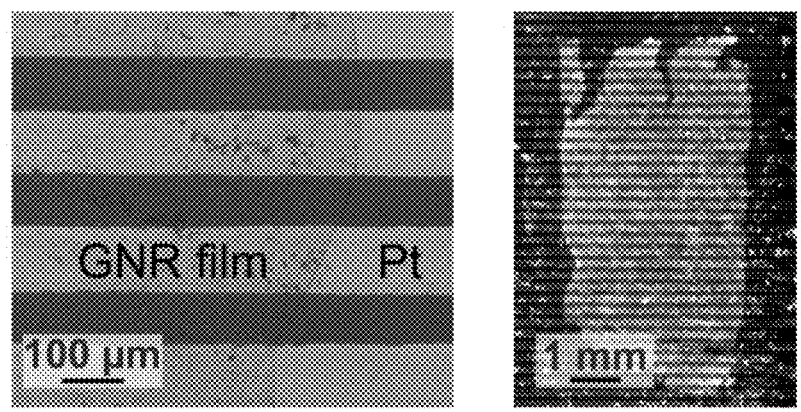
FIG. 2A  FIG. 2B  FIG. 2C
FIG. 2E  FIG. 2D

FIG. 3A
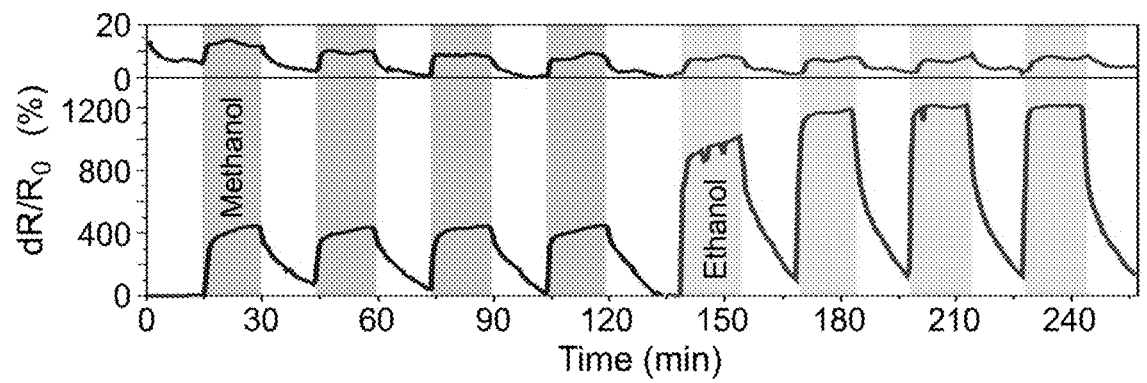
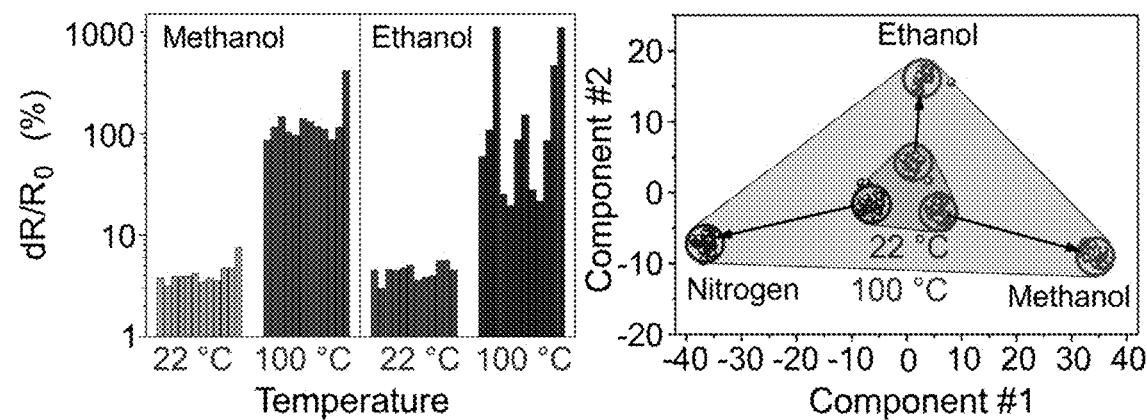
FIG. 3B
FIG. 3C

PTCDA            5-AGNRs

FIG. 12A
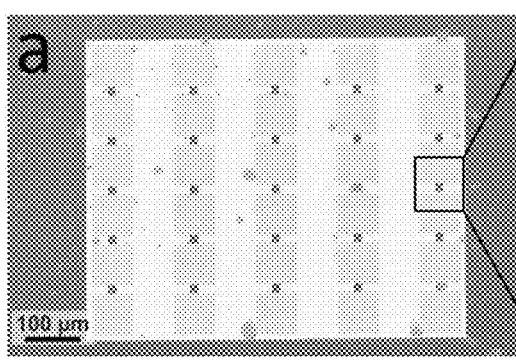
FIG. 12B
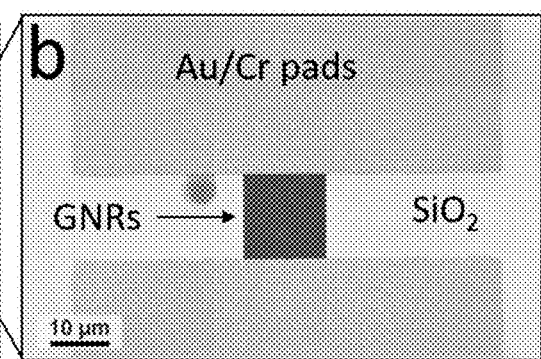
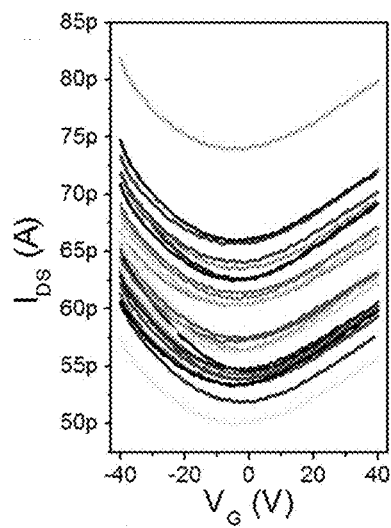
FIG. 12C
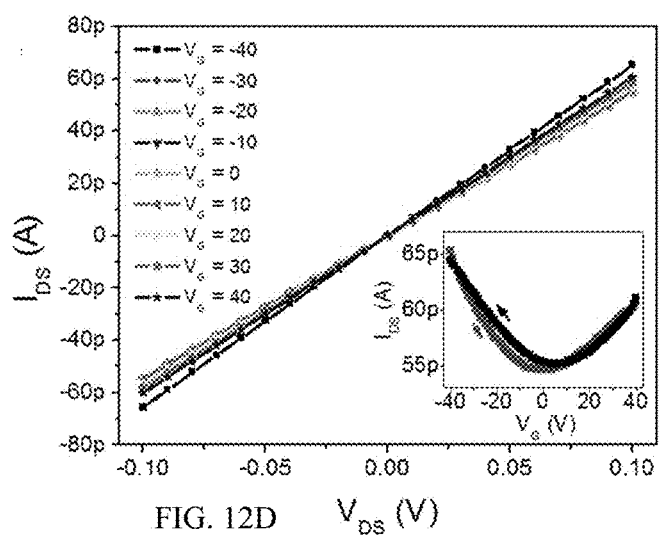
FIG. 12D
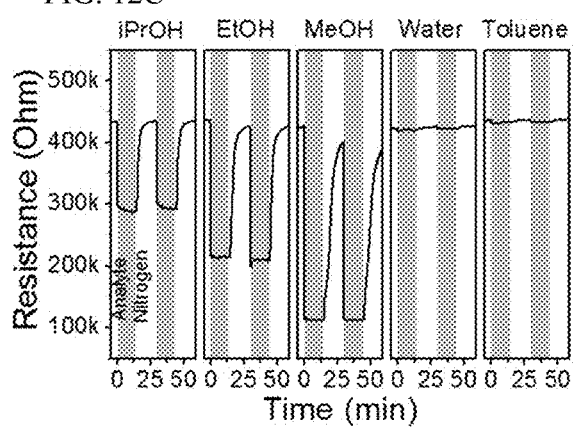
FIG. 12E
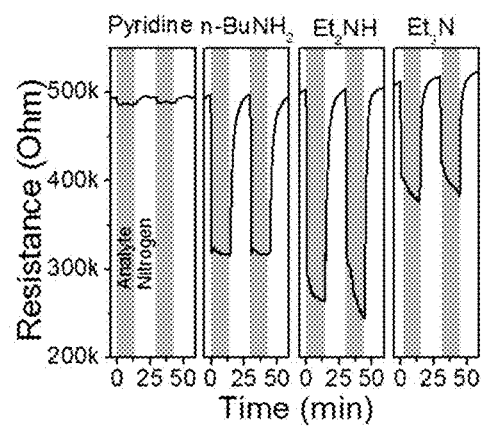
FIG. 12F

CARBON NANOSTRUCTURE BASED GAS SENSORS AND METHOD OF MAKING SAME

CROSS REFERENCES

The present Application claims priority to U.S. Provisional Patent Application No. 62/548,729 by Sinitskii et al., entitled "Carbon Nanostructure Based Gas Sensors and Method of Making the Same," filed Aug. 22, 2017, and incorporated in its entirety herein by reference.

GOVERNMENT SUPPORT CLAUSE

This invention was made with government support under CHE1455330 awarded by the National Science Foundation and under N00014-16-1-2899 awarded by the Office of Naval Research. The government has certain rights in the invention.

SUMMARY

The present disclosure provides carbon nanostructure based gas sensor elements and devices and method of making the same.

According to an embodiment, a gas sensor is provided that includes a sensing element including a substrate and a layer of carbon based nanostructures arranged on a surface of the substrate, wherein the carbon based nanostructures are arranged substantially perpendicular (e.g., at angles larger than 0 degrees) to the surface of the substrate, and wherein intercalation of a gas analyte between the carbon based nanostructures changes a conductivity of the layer of carbon-based nanostructures. In certain aspects, the carbon based nanostructures comprise graphene nanoribbons (GNRs). In certain aspects, the carbon based nanostructures comprise GNRs that comprise laterally extended graphene nanoribbons (eGNRs). In certain aspects, the carbon based nanostructures comprise GNRs that comprise straight graphene nanoribbons. In certain aspects, the carbon based nanostructures comprise polycyclic aromatic hydrocarbons. In certain aspects, the carbon based nanostructures comprise graphene-based and graphene-related materials that include but are not limited to graphite, graphene, graphite oxide, graphene oxide, chemically converted graphene, reduced graphene oxide, graphene quantum dots, carbon nanotubes, fullerenes, graphene nanomeshes, graphene antidote lattices, unzipped carbon nanotubes, graphene nanodiscs, nanostructured graphenes, graphene foams, graphene scaffolds, and combinations of thereof. In certain aspects, the carbon based nanostructures comprise carbon materials in which some (e.g., no more than about 50%) of carbon atoms are substituted with heteroatoms, such as N, B, S, P, Si or others. In certain aspects, the carbon based nanostructures are modified with functional groups that comprise at least one of carboxyl groups, amine groups, phenol groups, alkyl groups, epoxy groups, amides, esters, hydroxyl groups, aryl groups, carbonyl groups, thiols, phosphonic acids, and combinations thereof. In certain aspects, the gas sensor further includes first and second electrodes arranged on opposite ends of the substrate. In certain aspects, the gas sensor further includes a processing element communicably coupled to the first and second electrodes and adapted to receive a sensor response signal from the first and second electrodes, wherein the sensor response signal is indicative of an amount of the gas analyte adsorbed by the layer of carbon-based nanostructures.

According to another embodiment, a gas sensor is provided that includes a sensing element including a substrate and a layer of carbon based nanostructures arranged on a surface of the substrate, wherein the carbon based nanostructures are arranged substantially perpendicular (e.g., at angles larger than 0 degrees) to the surface of the substrate, wherein a first region of the layer includes a first arrangement of the carbon based nanostructures morphologically different from a second arrangement of the carbon based nanostructures in a second region of the layer, such that intercalation of a first gas analyte between the carbon based nanostructures in the first region changes a conductivity of the layer of carbon-based nanostructures in the first region by a greater amount than intercalation of a second gas analyte between the carbon based nanostructures in the first region, and such that intercalation of the second gas analyte between the carbon based nanostructures in the second region changes a conductivity of the layer of carbon-based nanostructures in the second region by a greater amount than intercalation of the first gas analyte between the carbon based nanostructures in the second region. In certain aspects, the first gas analyte comprises ethanol molecules and the second gas analyte comprises methanol molecules. In certain aspects, the substrate includes at least a first pair of substrate electrodes arranged in a parallel pattern on the surface of the substrate in the first region, and at least a second pair of substrate electrodes arranged in a parallel pattern on the surface of the substrate in the second region. In certain aspects, the carbon-based nanostructures comprise graphene nanoribbons (GNRs). In certain aspects, the carbon-based nanostructures comprise GNRs that comprise laterally extended graphene nanoribbons (eGNRs). In certain aspects, the carbon-based nanostructures comprise polycyclic aromatic hydrocarbons. In certain aspects, the carbon based nanostructures comprise graphene-based and graphene-related materials that include but are not limited to graphite, graphene, graphite oxide, graphene oxide, chemically converted graphene, reduced graphene oxide, graphene quantum dots, carbon nanotubes, fullerenes, graphene nanomeshes, graphene antidote lattices, unzipped carbon nanotubes, graphene nanodiscs, nanostructured graphenes, graphene foams, graphene scaffolds, and combinations of thereof. In certain aspects, the carbon-based nanostructures comprise carbon materials in which some (e.g., no more than 50%) of carbon atoms are substituted with heteroatoms, such as N, B, S, P, Si or others. In certain aspects, the carbon-based nanostructures are modified with functional groups that comprise at least one of carboxyl groups, amine groups, phenol groups, alkyl groups, epoxy groups, amides, esters, hydroxyl groups, aryl groups, carbonyl groups, thiols, phosphonic acids, and combinations thereof.

According to yet another embodiment, a gas sensor is provided that includes a first sensing element including a first substrate and a first layer of carbon based nanostructures arranged on a surface of the first substrate, wherein the first layer of carbon based nanostructures are arranged substantially perpendicular (e.g., at angles larger than 0 degrees) to the surface of the first substrate, a second sensing element including a second substrate and a second layer of carbon based nanostructures arranged on a surface of the second substrate, wherein the second layer of carbon based nanostructures are arranged substantially perpendicular (e.g., at angles larger than 0 degrees) to the surface of the second substrate, wherein the first layer of carbon based nanostructures are morphologically different than the second layer of carbon based nanostructures such that intercalation of a first gas analyte between the carbon based nanostructures in the first sensing element changes a conductivity of the first layer of carbon-based nanostructures in the first sensing element by a greater amount than intercalation of a second gas analyte between the carbon based nanostructures in the first sensing element, and such that intercalation of the second gas analyte between the carbon based nanostructures in the second sensing element changes a conductivity of the second layer of carbon-based nanostructures in the second sensing element by a greater amount than intercalation of the first gas analyte between the carbon based nanostructures in the second sensing element. In certain aspects, the first gas analyte comprises ethanol molecules and the second gas analyte comprises methanol molecules. In certain aspects, the first layer and the second layer of carbon-based nanostructures each comprise graphene nanoribbons (eGNRs). In certain aspects, the first layer and the second layer of carbon-based nanostructures each comprise GNRs that comprise laterally extended graphene nanoribbons (eGNRs). In certain aspects, the carbon-based nanostructures comprise polycyclic aromatic hydrocarbons. In certain aspects, the carbon based nanostructures comprise graphene-based and graphene-related materials that include but are not limited to graphite, graphene, graphite oxide, graphene oxide, chemically converted graphene, reduced graphene oxide, graphene quantum dots, carbon nanotubes, fullerenes, graphene nanomeshes, graphene antidote lattices, unzipped carbon nanotubes, graphene nanodiscs, nanostructured graphenes, graphene foams, graphene scaffolds, and combinations of thereof. In certain aspects, the carbon-based nanostructures comprise carbon materials in which some (e.g., no more than 50%) of carbon atoms are substituted with heteroatoms, such as N, B, S, P, Si or others. In certain aspects, the carbon-based nanostructures are modified with functional groups that comprise at least one of carboxyl groups, amine groups, phenol groups, alkyl groups, epoxy groups, amides, esters, hydroxyl groups, aryl groups, carbonyl groups, thiols, phosphonic acids, and combinations thereof. (eGNRs). According to yet a further embodiment, a method of forming laterally extended graphene nanoribbons (eGNRs) is provided. The method typically includes synthesizing 2-([1,1': 2',1"-terphenyl]-3'-yl)-6,11-dibromo-1,4-diphenyltriphenylene as substantially described herein below, polymerizing it using $Ni^0$-mediated Yamamoto coupling, and then forming eGNRs by oxidative cyclodehydrogenation of the resulting polymer via the Scholl reaction using iron (III) chloride. The eGNRs formed may be used in forming a layer of eGNRs on a surface of a substrate.

According to yet a further embodiment, a method of forming anhydride-functionalized straight graphene nanoribbons with armchair edges is provided. The method typically includes growing films of graphene nanoribbons by chemical vapor deposition of perylene-3,4,9,10-tetracarboxylic dianhydride (PTCDA) directly on a substrate of interest.

According to yet another embodiment, a gas sensor is provided that includes a substrate and at least three sensing elements on a substrate, each sensing element comprising two separated electrodes, and a layer connecting the electrodes, the layer comprises carbon based nanostructures that are arranged at angles other than 0 degrees to the surface of a substrate. The layers of carbon-based nanostructures may be morphologically different for each sensing element such that intercalation of a gas analyte between the carbon based nanostructures in any given sensing element changes a conductivity of that element by an amount different from the change in conductivity of any other sensing element caused by intercalation of the same gas analyte therein. In certain aspects, a number of sensing elements is from 3 to 20. In certain aspects, a number of sensing elements is greater than 20.

In certain aspects, the carbon based nanostructures herein include polycyclic aromatic hydrocarbons including naphthalene, anthracene, tetracene, pentacene, heptacene, rubrene, perylene, terrylene, quaterrylene, pyrene, phenanthrene, chrysene, triphenylene, corannulene, benzo[ghi]perylene, ovalene, coronene, or hexabenzocoronene, or combinations thereof.

In certain aspects, the carbon based nanostructures herein include graphene-based and graphene-related materials including graphite, graphene, graphite oxide, graphene oxide, chemically converted graphene, reduced graphene oxide, graphene quantum dots, carbon nanotubes, fullerenes, graphene nanomeshes, graphene antidote lattices, unzipped carbon nanotubes, graphene nanodiscs, nanostructured graphenes, graphene foams, or graphene scaffolds, or combinations of thereof.

In certain aspects, the carbon-based nanostructures herein include carbon materials in which some of the carbon atoms are substituted with heteroatoms, including N, B, S, P, or Si.

In certain aspects, the carbon based nanostructures herein may be modified with functional groups that comprise at least one of anhydride groups, carboxyl groups, amine groups, phenol groups, alkyl groups, epoxy groups, amides, esters, hydroxyl groups, aryl groups, carbonyl groups, thiols, phosphonic acids, and combinations thereof.

In certain aspects, the carbon based nanostructures herein include one or more of sheets of two-dimensional materials, including graphene oxide, graphane, graphyne, borophene, germanene, silicene, stanene, phosphorene, hexagonal boron nitride, borocarbonitride, transition metal chalcogenides, such as $MoS_2$, $WS_2$, $MoSe_2$, $WSe_2$, $MoTe_2$, $WTe_2$, $ReS_2$, $ReSe_2$, $PtSe_2$, $PtSe_2$, $TiS_2$, $TiS_3$, $TiSe_3$, $TiTe_3$, $ZrS_2$, $ZrS_3$, $ZrSe_3$, $ZrTe_3$, $HfS_2$, $HfS_3$, $HfSe_3$, $HfTe_3$ and many others, transition metal carbides, transition metal nitrides, transition metal carbonitrides, two-dimensional dimensional oxides, two-dimensional metals, two-dimensional metal-organic frameworks and combinations of thereof.

In certain aspects, the gas analyte herein may include at least one of the alcohol molecules, including methanol, ethanol, n-propanol, isopropanol, n-butanol, 2-butanol, phenol, and combinations of thereof.

In certain aspects, the gas analyte herein may include at least one of the volatile organonitrogen compounds, including pyridine, pyrrole, methylamine, dimethylamine, trimethylamine, ethylamine, n-butylamine, aniline, 4-methoxyaniline, N,N-dimethylaniline, 3-nitroaniline, 4-nitroaniline, 4-trifluoromethylaniline, and combinations of thereof.

In certain aspects, the gas analyte herein may include at least one of the volatile organophosphorus compounds, including phosphine, diphosphine, trimethylphosphine, trimethoxyphosphine, trimethoxyphosphine, tryphenylphosphine, parathion, malathion, methyl parathion, chlorpyrifos, diazinon, dichlorvos, phosmet, fenitrothion, tetrachlorvinphos, azamethiphos, azinphos-methyl, methylphosphonofluoridate, ethyl dimethylphosphoramidocyanidate, 3,3-dimethylbutan-2-yl methylphosphonofluoridate, and combinations of thereof.

In certain aspects, the gas analyte herein may include at least one of the volatile organosulfur compounds, volatile organohalogen compounds, and combinations of thereof.

In certain aspects, the gas analyte herein may include at least one of the volatile inorganic compounds, including water, $H_2S$, $H_2Se$, $H_2Te$, boranes, $BH_3$, $B_2H_6$ and $B_3H_7$, diatomic halogens, vapors of inorganic acids and combinations of thereof.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying FIGS. The use of the same reference numbers in different instances in the description and the FIGS. may indicate similar or identical items.

FIG. 2A shows a scheme of the interfacial self-assembly of GNRs.

FIG. 2B shows a scheme of the self-assembly of GNRs on a water surface.

FIG. 2C shows an optical photograph of a multielectrode chip with a self-assembled GNR film.

FIG. 2D shows an optical photograph of the active area of the multielectrode chip; the bright horizontal lines are Pt electrodes and the rectangle in the center is the GNR film.

FIG. 2E shows a SEM image of the fragment of the GNR film on the multielectrode structure.

FIG. 3A shows representative dynamic responses of a selected segment of a GNR sensor array to 500 ppm methanol and ethanol at room temperature (22° C.) and at 100° C.; vertical stripes indicate periods of time when the sensor was exposed to analytes.

FIG. 3B shows sensor responses ($\Delta R/R_0$, %) of 12 representative GNR sensor segments to 500 ppm ethanol and methanol, respectively, at room temperature (22° C.) and 100° C.

FIG. 3C shows the results of LDA processing of the responses generated by the array of GNR sensors that were exposed to nitrogen mixed with 500 ppm of ethanol and methanol at 22° C. (small triangle) and 100° C. (large triangle).

FIG. 12A shows a SEM image of an array devices based on 5-AGNR film.

FIG. 12B shows a SEM image of an individual device from the array shown in FIG. 12A.

FIG. 12C shows $I_{SD}$-$V_G$ curves for the devices from the array shown in FIG. 12A.

FIG. 12D shows $I_{DS}$-$V_{DS}$ curves for one of the measured devices; the inset represents $I_{DS}$-$V_G$ curve for one device indicating its ambipolar behaviour with a slight hysteresis.

FIG. 12E and FIG. 12F shows sensor properties of one of the devices in response to various analytes at the concentration of 500 ppm.

DETAILED DESCRIPTION

Gas sensors are provided that are based on nanostructured graphitic building blocks, such as graphene nanoribbons (GNRs) or other carbon based structures.

Figure 1:
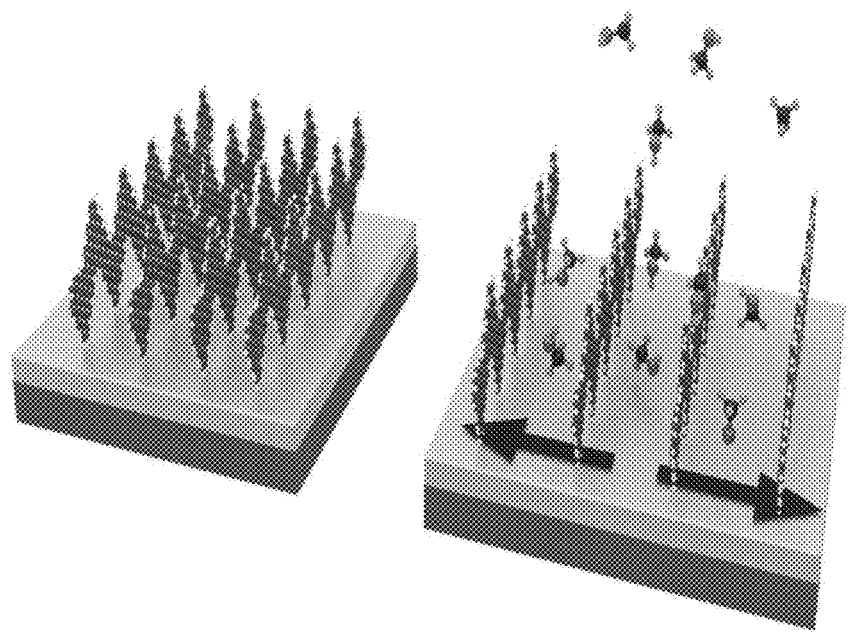
FIG. 1 shows a scheme illustrating the intercalation of analyte molecules between graphene nanoribbons in a film. The intercalation results in increasing the distances between graphene nanoribbons, which, in turn, changes the electrical resistance of a film.

FIG. 1 shows a sensor element including a continuous electrically conductive film including a plurality of GNRs according to an embodiment. The electron transport in such films depends on the hopping of charge carriers from one nanoribbon to another, and therefore the conductivity is sensitive to the distance between nanoribbons. A feature of this structure is the perpendicular arrangement of GNRs with respect to the substrate (e.g. vertical, or nearly vertical, arrangement relative to a horizontal substrate surface), which makes the spacings (e.g., interplanar spacings), between them easily accessible to analyte molecules. In general substantially perpendicular or substantially vertical as used herein includes angles larger than 0 degrees) to the relevant surface and is dependent in part on the morphology and structure of the specific carbon nanostructure used. Such arrangement of carbon nanostructures enables intercalation of analyte molecules, as shown schematically in FIG. 1. FIG. 1 shows that when molecules intercalate between GNRs, the spacings (e.g., interplanar spacings), between the nanoribbons increases and the electrical conductivity of the film decreases. Electrodes (not shown) arranged at ends of the substrate may be used to measure a sensor response signal, e.g., current signal. A processing element (not shown), such as a processor, may receive and process the response signal to determine a quantitative value representing an amount of the analyte present in the environment proximal to the sensor element.

The perpendicular stacking of GNRs shown in FIG. 1 is fundamentally different from the structure of other graphene-based sensors in the prior art. Prior art sensors generally consist of large-scale graphene sheets, rather than nanoscopic graphitic building blocks; these sheets are arranged parallel to the substrate rather than perpendicular, which could not enable the described intercalation mechanism. A perpendicular arrangement of GNRs may be achieved using the procedure shown in FIGS. 2A-E, which show aspects of fabrication of a GNR-based gas sensor as will be discussed below, according to an embodiment.

Figure 4A:
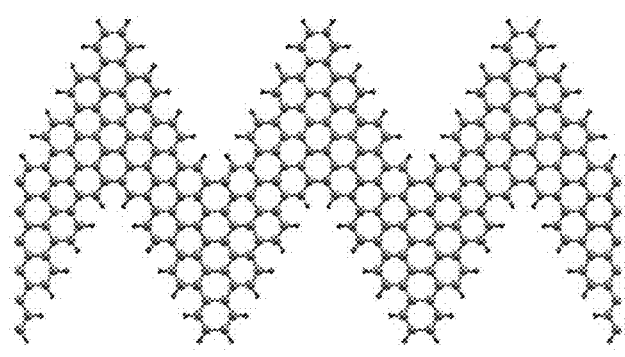
FIG. 4A shows a simplified atomic structure of a fragment of a GNR according to an embodiment.
Figure 4B:
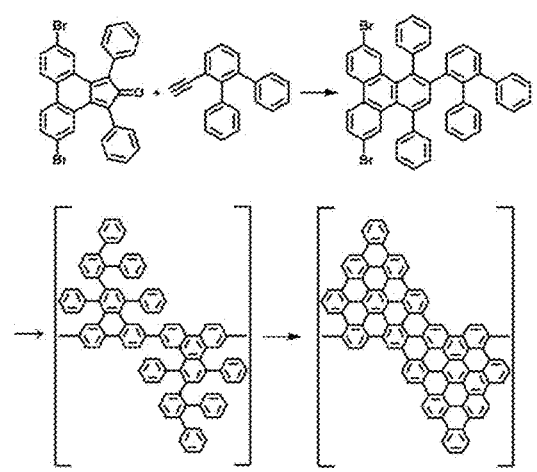
FIG. 4B shows a simplified synthetic route for the GNR shown in FIG. 4A.
Figure 5:
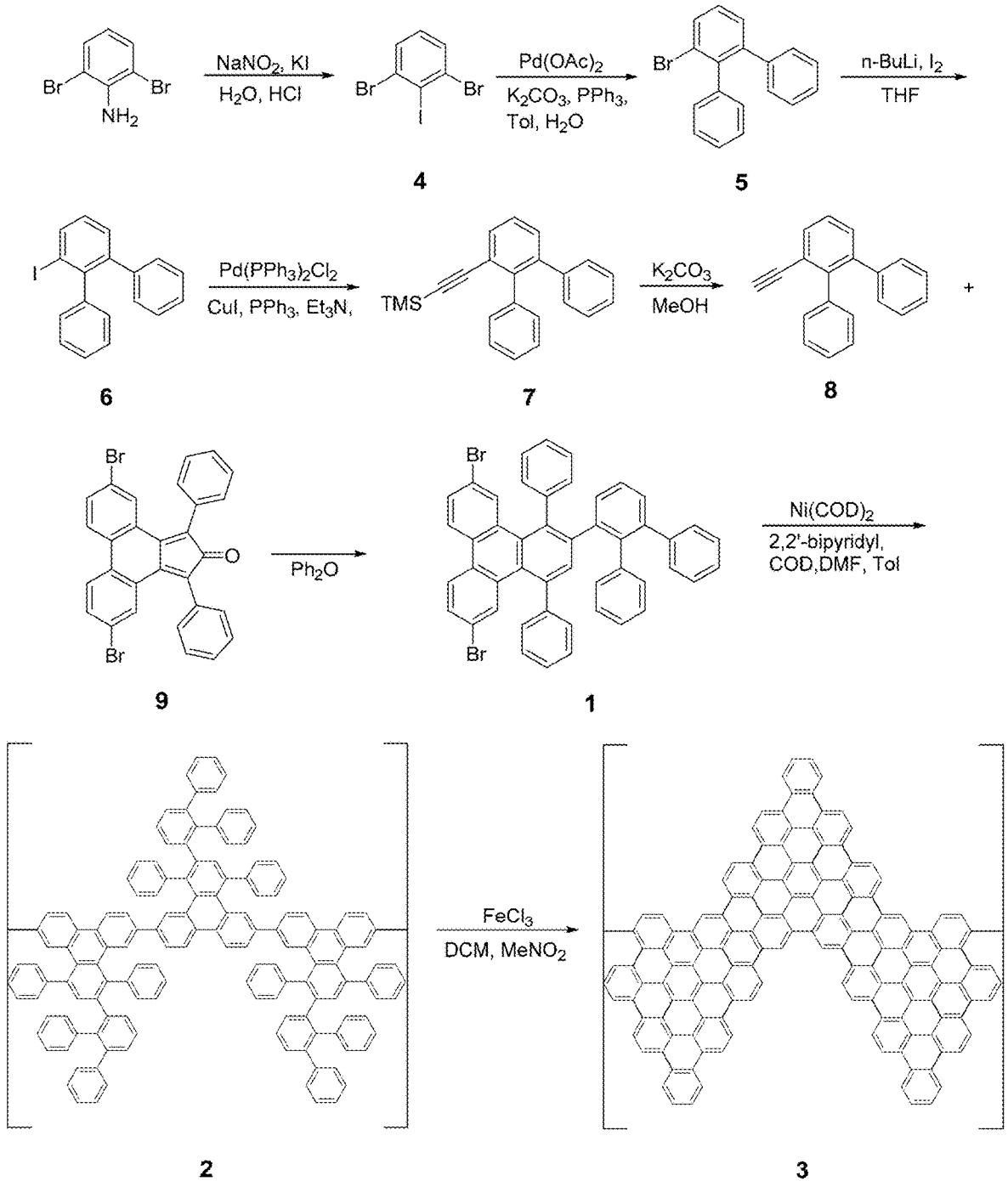
FIG. 5 shows a detailed synthetic route for synthesizing eGNRs according to an embodiment.
Figure 6:
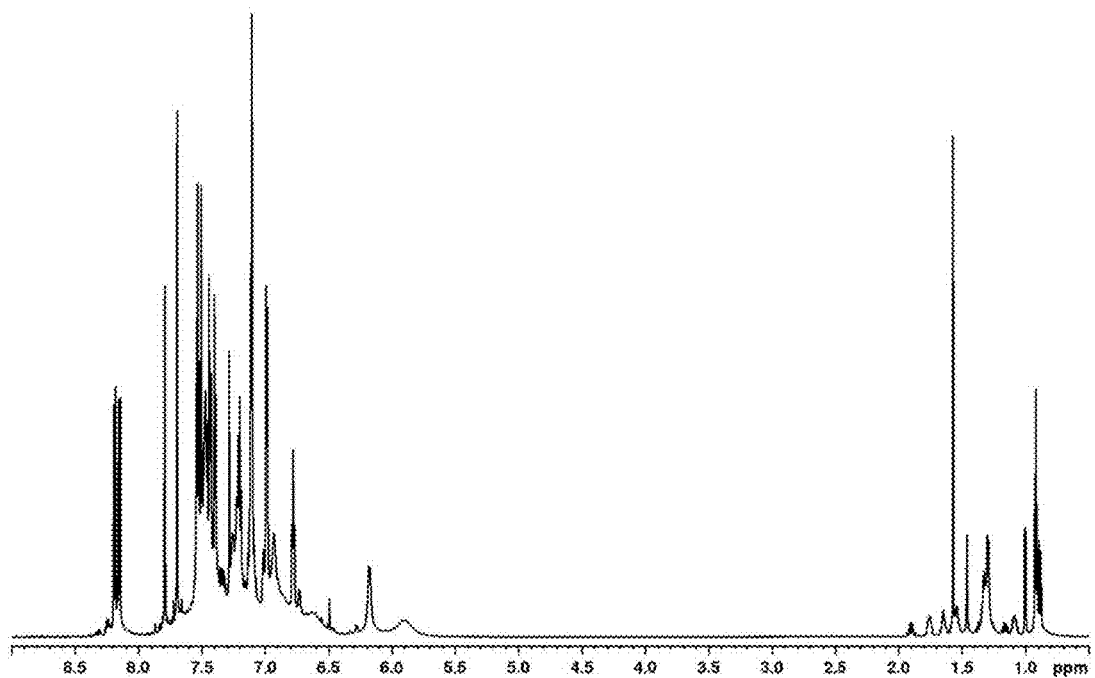
FIG. 6 shows $^1H$ NMR of 2-([1,1':2',1''-terphenyl]-3'-yl)-6,11-dibromo-1,4-diphenyltriphenylene (1) in $CDCl_3$.
Figure 7:
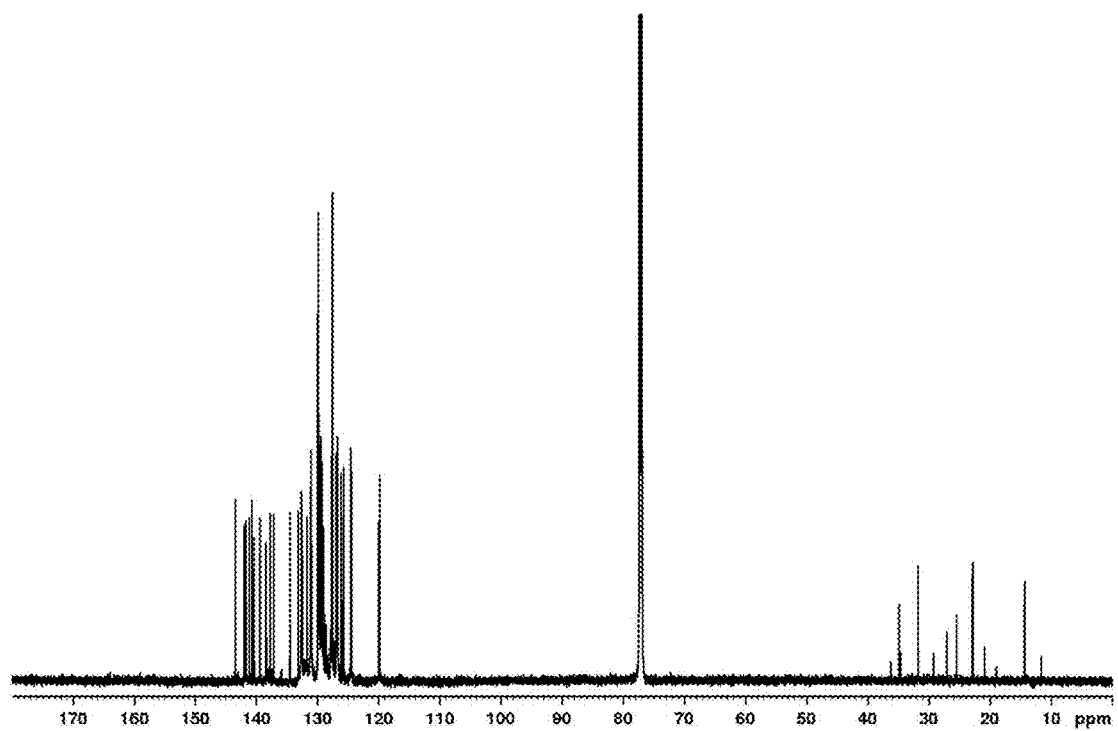
FIG. 7 shows $^{13}C$ NMR of 2-([1,1':2',1''-terphenyl]-3'-yl)-6,11-dibromo-1,4-diphenyltriphenylene (1) in $CDCl_3$.
Figure 8:
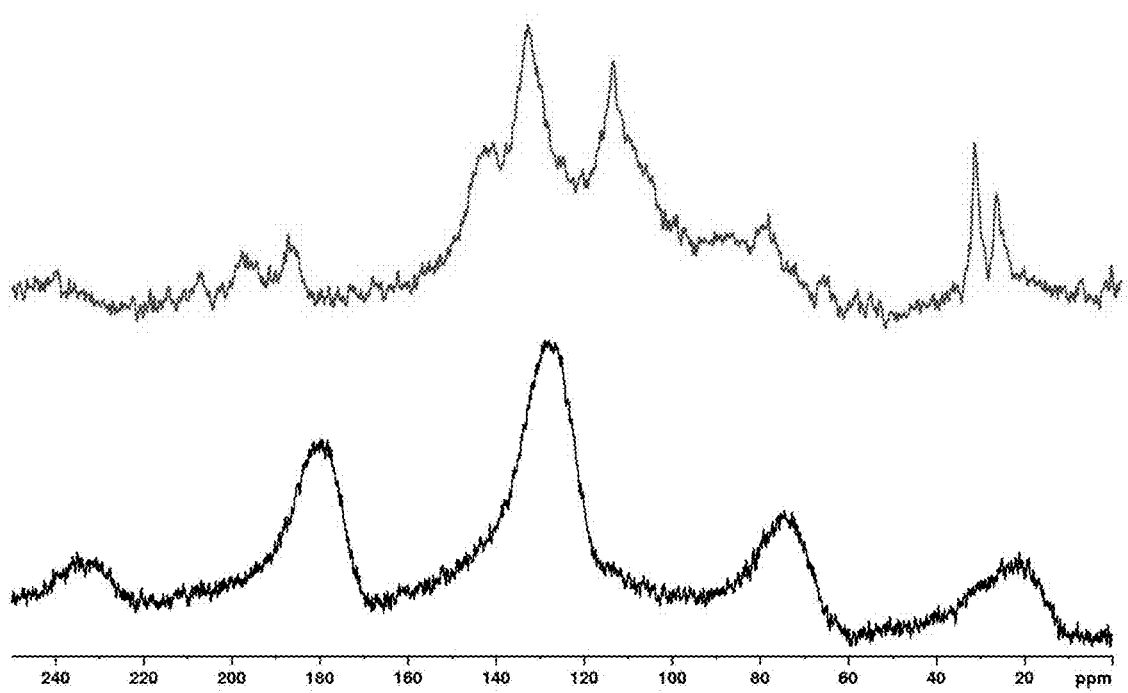
FIG. 8 shows $^{13}C$ solid state NMR of the polymer (2) (red) and GNRs (3) (black).

A method of synthesizing laterally extended chevron GNRs (eGNRs) is schematically shown in FIG. 5; a simplified synthetic route is shown in FIG. 4B and the entire synthetic route is shown in FIG. 5 and described in detail below. In brief, first compound 9 was synthesized, which is a common precursor for chevron-type GNRs, including regular chevron GNRs (cGNRs) and nitrogen-doped chevron GNRs. Then, precursor molecule 1 was synthesized through the Diels-Alder reaction between compound 9 and 3'-ethynyl-1,1':2',1''-terphenyl 8. Then, molecule 1 was polymerized using $Ni^0$-mediated Yamamoto coupling, forming polymer 2. Finally, eGNRs 3 were produced by oxidative cyclodehydrogenation of polymer 2 via the Scholl reaction using iron (III) chloride. $^1H$ and $^{13}C$ NMR data for compounds 1, 2 and 3 are shown in FIGS. 6-8. The resulting eGNRs were washed from impurities, isolated as a black powder and then used for materials characterization and device fabrication.

FIG. 2A shows an interfacial self-assembly approach to fabricating such films of perpendicular (e.g. vertical) stacked GNRs according to an embodiment. This method takes advantage of the high solubility of non-functionalized GNRs in chlorosulfonic acid (CSA), while they are insoluble in most other solvents. When a droplet of a GNR solution in CSA is delivered to the surface of water, CSA reacts instantly with $H_2O$ forming sulfuric and hydrochloric acids that are dissolved in water, leaving hydrophobic GNRs at the polar water-air interface. The GNRs, which are insoluble in water, minimize their interaction with the water molecules by forming a densely packed self-assembled film of π-π stacked nanoribbons, as shown in FIG. 2B. The GNR film can be washed from the CSA residues by transferring the film to the surface of deionized (DI) water (this procedure may be repeated several times) and eventually fished out or extracted with a substrate of choice. In one example, the self-assembled films of GNRs may be fished out from the surface of DI water with multi-electrode chips, one possible design developed in Karlsruhe Institute of Technology (Germany) is shown in FIG. 2C.

Previously, such multi-electrode chips were used to measure electronic and sensor properties of other graphitic materials, such as reduced graphene oxide and graphene. FIG. 2D shows the active area of a chip, which in this example consists of an 8×10 $mm^2$ Si/SiO2 substrate with 39 Pt electrodes (100×3000 $\mu m^2$ each) that are separated by ~70 μm gaps, and two Pt thermoresistors. When deposited on the multi-electrode chip, the GNR film (a bright rectangle in the center of FIG. 2D) bridges the Pt electrodes, thus forming 38 two-terminal GNR devices in the given exemplary electrode architecture that can be measured independently using electrodes attached to the various terminals or electrode ends. In general, any number, e.g., two or more, of GNR devices or regions within a device may be formed. FIG. 2E shows scanning electron microscopy (SEM) image in which the edge of the GNR film bridging several Pt electrodes is clearly visible. The back side of the $Si/SiO_2$ substrate may contains one or more independent Pt meander heaters, which allow one electrical measurements at elevated temperatures.

Previously, these chips were used to measure electronic and sensor properties of other graphene materials, such as reduced graphene oxide (GO) and graphene films grown by chemical vapor deposition (CVD). In those studies, the sensor responses of GO and CVD graphene to various alcohols, such as methanol, ethanol and isopropanol were tested. Therefore, for the sake of comparison of atomically precise GNRs with important graphene materials that are commonly used in sensor studies, here the results of similar sensing experiments with GNRs (FIG. 3A-C) are shown. In general, when analytes adsorb on graphene, the electrical conductivity of the graphene changes because of charge doping by the molecules. More specifically, when GO or CVD graphene sensors are exposed to low molecular weight alcohols, their resistance increases. The same was observed for GNR based sensors, but the magnitude of the effect was much greater. Segments of the multi-electrode chips covered with GO films or CVD graphene changed their resistance upon exposure up to 1500 ppm of ethanol or methanol by only a few percent. For GNR based sensors as described herein, resistance changes of several hundred percent at lower (500 ppm) vapor concentrations were observed; for instance, the resistance of some of the GNR segments grew by over 1200% when they were exposed to 500 ppm ethanol at 100° C. (FIG. 3A), which can be associated with the unique microstructure of the GNR films (FIG. 1).

The sensor response of GNR films to alcohols greatly increases at elevated temperatures, as illustrated by FIGS. 3A and 3B. FIG. 3A shows representative data for dynamic sensor responses of a GNR device in a multi-sensor array that was measured at room temperature and 100° C., while FIG. 3B shows relative resistance changes ($\Delta R/R_0$) of 12 different GNR segments. Note that the same segments are shown in the same order for methanol and ethanol at both temperatures, and the segments were chosen to show both minimum and maximum responses. These results can be rationalized by the fact that at high temperature, the increased interplanar spacings between GNRs and higher kinetic energies of analyte molecules should both facilitate the intercalation.

The analysis of the responses of different sensors, especially at high temperature, further suggests the importance of the morphological features of GNR segments for their sensor behavior. FIG. 3B shows that at room temperature the responses of 12 GNR segments to both methanol and ethanol are comparable. However, the situation changes at 100° C., where the signals remain fairly uniform in case of the methanol sensing but vary considerably for the ethanol exposure. Remarkably, some sensors show higher responses to methanol than to ethanol, while others show the opposite behavior. This cannot be explained solely by the doping of GNRs by the methanol and ethanol molecules, which would cause the same trend for all devices when switching from methanol to ethanol. However, as previously shown, the morphology of the GNR channels of different segments could vary considerably, because the film includes randomly oriented domains of π-π stacked nanoribbons and nanoscopic holes. These morphological differences between different segments are likely to contribute to the local kinetics of adsorption and intercalation of alcohol molecules and thus to the observed device-to-device variability. Of note, no difference in the range of $\Delta R/R_0$ values was observed for these analytes in experiments with similar GO or CVD graphene sensors—for these sensors, the intercalation effects should not be as important as for the devices made of vertically stacked GNRs, while the doping effects of methanol and ethanol were comparable.

Because both methanol and ethanol cause a resistance increase in GNR devices, differentiation between these analytes using a single GNR sensor may be difficult. In one embodiment, the selectivity toward similar analytes is achieved by employing an array of sensors devices, or sensor regions within one or more sensor devices, that have a device-to-device variability. In one embodiment, an array of such sensors is provided. The array of sensors, for which the data are processed using pattern recognition algorithms, could be considered as an electronic nose or "e-nose." E-nose systems demonstrate very high selectivity in analyte recognition: although the intrinsic selectivity of a sensing material may be low, the combination of several segments in an array provides a very large information content. In certain aspects, the e-nose system is first calibrated to create a library of analytes of interest, and in the following recognition experiments, the measured analyte signals are compared with ones recorded in the library. For the best performance of an e-nose system, the segments or regions of an array should exhibit a substantial variability in their sensor properties.

As shown in FIG. 3B, the GNR segments of an embodiment of a multi-electrode chip naturally has a large device-to-device (or, segment-to-segment) variation because they include randomly oriented domains of π-π stacked ribbons with varying lengths. Additionally, the transfer process may produce macroscopic cracks, tears and holes in the GNR film and thus contribute to the variability between GNR device channels in different segments or regions. The sensor responses of different GNR segments for the same analyte at the same conditions could vary by up to two orders of magnitude (see, $\Delta R/R_0$ values in the experiment on ethanol sensing at 100° C.). Therefore, the multi-electrode chip covered with a GNR film can be directly employed as an e-nose system. Similarly, in an embodiment, two or more devices can be arrayed to form an e-nose system, wherein each device includes one or more sensing regions or segments with the same or different carbon-based nano-structure sensing material (e.g., eGNR) with the same or differing morphologies.

The observed variability in sensor responses of GNR segments was sufficient to reliably discriminate methanol and ethanol at concentrations of 500 ppm, as well as nitrogen. Sensor responses, excluding the first "exposure-purge" cycle, were processed by a pattern recognition technique. One example is Linear Discriminant Analysis (LDA). This technique transfers the multidimensional sensor signals to a reduced low-dimensional space where the sensor responses of GNR segments are grouped into separate clusters representing different analytes; the distances between vectors corresponding to different clusters are maximized to ensure reliable gas recognition. FIG. 3C shows the results of the LDA processing of the data from a GNR-based multi-electrode chip with the confidence probability of 0.95 at room temperature and at 100° C. The results demonstrate the capability of the GNR sensor array to reliably discriminate analytes of nearly the same chemical nature, such as the low molecular weight alcohols discussed herein. Because of the higher sensor responses and their larger variability at higher temperatures, the discrimination of methanol and ethanol is considerably more efficient at 100° C. (large green triangle in FIG. 3C), compared to room temperature (small blue triangle in FIG. 3C).

It should be appreciated that, in other embodiments, sensors can be constructed from one or more layers of other graphitic materials, such as various polyaromatic hydrocarbon (PAH) molecules, graphene quantum dots, nanosheets, etc. Sheets of other two-dimensional materials, such as transition metal chalcogenides ($MoS_2$, $MoSe_2$, $WS_2$, $WSe_2$, $TiS_3$ and many others), phosphorene, silicone, germanene, etc., may also be arranged at angles other than 0 degrees relative to a surface of a substrate to realize similar sensor systems.

Figure 9:
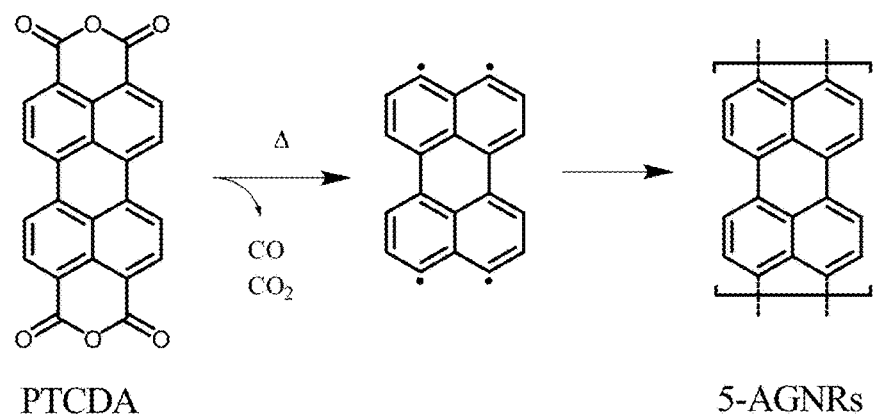
FIG. 9 shows a mechanism of thermal decomposition of perylene-3,4,9,10-tetracarboxylic dianhydride (PTCDA) resulting in the formation of straight armchair graphene nanoribbons (5-AGNRs).

It should be appreciated that atomically precise graphene nanoribbons may also be formed using a chemical vapor deposition (CVD) approach, e.g., formation of thin films of atomically precise 5-AGNRs via thermal decomposition of PTCDA (perylene-3,4,9,10-tetracarboxylic dianhydride), which may have an advantage of increased scalability for industrial production. The scheme of the formation of 5-AGNRs via thermal decomposition of PTCDA is shown in FIG. 9. The resulting 5-AGNRs possess anhydride groups at their ends, which originate from the PTCDA precursor. In general, chemical functionalization of GNRs may be performed to enhance selectivity and sensitivity of the sensor elements.

Figures 10A, 10B:
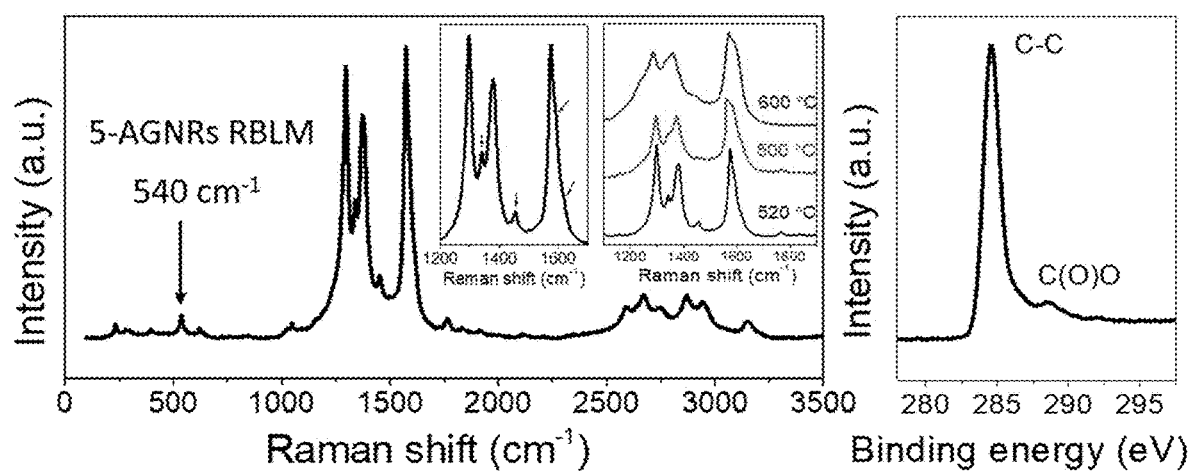
FIG. 10A shows a Raman spectrum of 5-AGNRs; the left inset represents zoomed-in area for D- and G-bands with side peaks shown by the black arrows, and the right inset shows a comparison of Raman spectra for samples fabricated at different temperatures.
FIG. 10B shows XPS C1s spectrum of the 5-AGNR film fabricated at 520° C.

A method for growing films of atomically precise 5-AGNRs comprises heating the PTCDA precursor located directly below the substrate in a chemical vapor deposition (CVD) system. If the growth conditions (temperature, pressure and time) are optimized, the method produces graphene nanoribbons of high quality as shown by Raman spectroscopy in FIG. 10A. FIG. 10A shows Raman spectrum of 5-AGNRs grown at 520° C. for 30 min under 1 atmosphere or Ar gas, which exhibits highly pronounced G-(1570 $cm^{-1}$) and two D-bands (1297 and 1375 $cm^{-1}$), as well as the smaller additional bands. The structure of the peaks and their sharpness indicate high structural quality of the CVD-grown 5-AGNRs.

Temperature of the deposition plays an important role and if it is performed at the temperature below 520° C., thin non-uniform films are formed on a substrate, which typically consist of isolated islands of low-quality 5-AGNRs. As an example, Raman spectrum of such islands deposited at 500° C. is shown in the inset of FIG. 10A. It shows wide peaks due to incomplete decomposition of the PTCDA molecules. At the same time, higher deposition temperatures, for instance 600° C., result in significant structural degradation of 5-AGNRs as shown by the corresponding Raman spectrum in the inset in FIG. 10A.

Unlike other methods for growing GNRs that work on metal substrates, the described method works on virtually any substrate that can withstand the growth temperature. It was found that the PTCDA deposition can be performed on $Si/SiO_2$ wafers, metals (e.g., Cu foils), mica or quartz slides. Significant differences between Raman spectra of 5-AGNR films grown for different times (10 minutes, 30 minutes or 1 hour) were not observed. These observations suggest that the actual formation of a film primarily occurs during the first 10 minutes of the process.

Although the deposition temperature of 520° C. is slightly higher than the decomposition temperature of PTCDA (~516° C.), the films also show presence of anhydrite groups. FIG. 10B shows C is XPS spectrum of the film with the main peak at 284.5 eV, corresponding to $sp^2$-carbon of the core perylene unit, and the side-peak at 288.5 eV, corresponding to the oxidized carbon of the dianhydride groups. The dianhydride groups are probably located at the termini of the formed nanoribbons.

One of the advantages of the described CVD approach presented the possibility to grow films on almost any substrate. Furthermore, in the case of temperature-sensitive substrates, such as polymers, the GNRs could be transferred from more stable substrates using different transfer techniques. One of the substrates from which GNR films could be conveniently transferred from is a Cu foil due to existence of transfer procedures that were developed for graphene grown on copper.

Figure 11A:
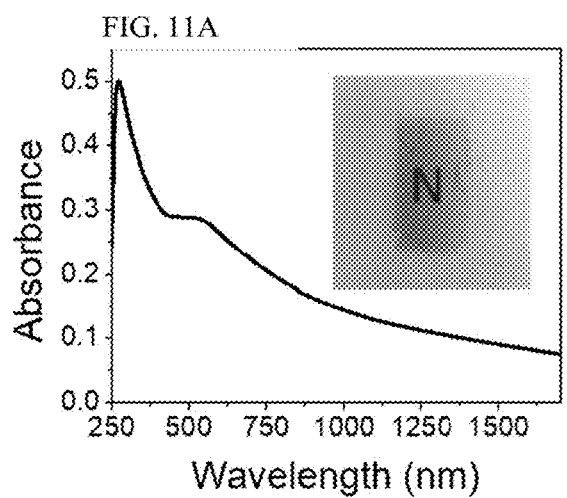
FIG. 11A shows UV-vis-NIR absorption spectrum of a 5-AGNR film; the inset shows an optical image of a film on a glass slide placed on top of the printed letter "N" to demonstrate the film's transparency.

When grown on a glass substrate or transferred to it, a 5-AGNR film is visually transparent as it is shown in the inset in FIG. 11A. UV-vis measurements of such films (FIG. 11A) show low absorption over the UV-visible-NIR region without a clear onset. This spectrum closely resembles the spectra of solution-synthesized GNRs with the same poly-peri-naphthalene aromatic core, which experience π-π aggregation in solution. In the CVD grown films the 5-AG-NRs are closely packed, which results in aggregation effects similar to the ones observed in solution-synthesized GNRs, polyaromatic hydrocarbons and conjugated polymer.

Figure 11B:
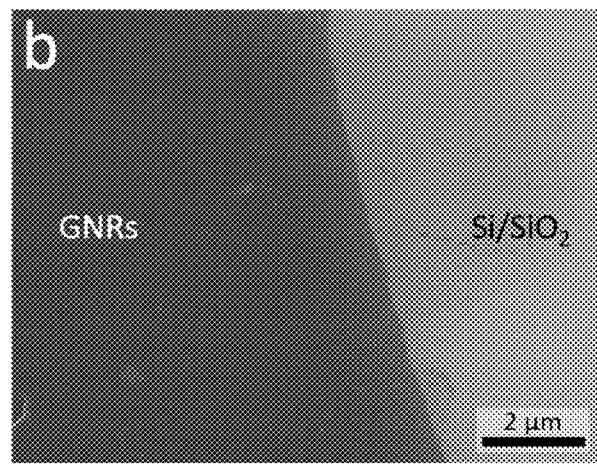
FIG. 11B shows a SEM image of a film transferred to a $Si/SiO_2$ substrate.
Figure 11C:
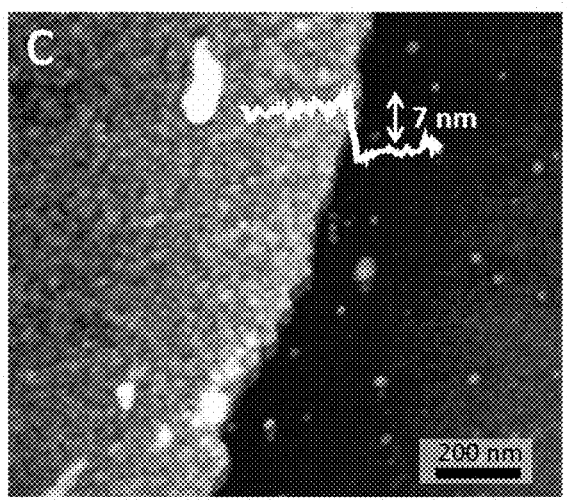
FIG. 11C shows an AFM image with corresponding height profile.
Figure 11D:
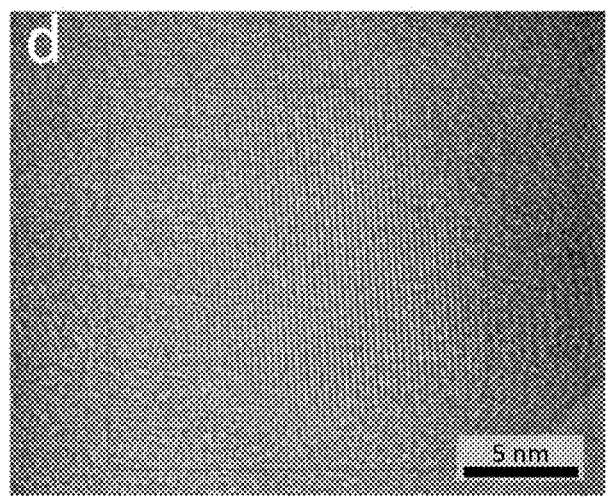
FIG. 11D shows a TEM image of a film; the inset square highlights a domain of aligned 5-AGNRs.

Importantly, CVD-grown films of 5-AGNRs uniformly cover the entire exposed surface of a substrate. Scanning electron microscopy (SEM) studies show that the films are also uniform on the scale of several micrometers (FIG. 11B). Atomic force microscopy (AFM) studies show that the CVD grown films of 5-AGNRs could be several nm thick; for instance, the film shown in FIG. 11C has a thickness of about 7 nm. Transmission electron microscopy (TEM) studies show polycrystalline structure of the CVD grown films of 5-AGNRs (FIG. 11D). The distance between GNRs is about 0.32 nm, which is in good agreement with the interplanar distance between the π-π stacked sheets of graphene in a graphite crystal. The highlighted domain in the TEM image in FIG. 11D is 15-20 nm in size, which could be recalculated to the length of an individual ribbon of 18-24 units.

Since the films of 5-AGNRs can be grown directly on insulating substrates, they can be conveniently patterned into arrays of field-effect transistors or gas sensors. FIG. 12A shows SEM image of an array of 25 electronic devices based on a patterned 5-AGNR film. SEM image of an individual device from the arrays is shown in FIG. 12B. This figure shows a device on a $Si/SiO_2$ substrate consisting of a patterned 5-AGNR film bridging two Cr/Au electrodes. In the following electrical measurements the Cr/Au electrodes were used as source (S) and drain (D) electrodes and the heavily doped p-type Si was used as a gate (G) electrode. As shown in FIG. 12C, all 25 devices showed ambipolar behaviour in drain-source current ($I_{DS}$)—gate voltage ($V_G$) measurements, which is characteristic for graphene (the measurements were performed at at $V_{DS}$=0.1 V). Good Ohmic contact between 5-AGNRs and Cr/Au electrodes is demonstrated by the linear $I_{DS}$-$V_{DS}$ dependencies, which were measured at various gate voltages.

For the gas sensing measurements, GNRs were grown on mica and transferred the film onto a chip with predeposited array of Pt contacts; the chip was similar to the one used for the characterization of sensor properties of eGNRs (FIG. 2C). FIG. 12E and FIG. 12F show the sensor responses of one of the sensing element in the array to a variety of analytes at the concentration of 500 ppm. This demonstrates that films of CVD grown GNRs can be used for sensor applications just as the films of GNRs that were synthesized and then self-assembled in solution.

An important difference between the 5-AGNRs and eGNRs discussed herein, is that the former contain anhydrite groups at their ends. The presence of these groups affects interaction of GNRs with polar molecules and thus affects their sensor properties. The functional groups can be tailored to enhance the responses of GNRs to certain analytes.

SYNTHESIS EXAMPLES

Materials

All starting materials and solvents were purchased from Sigma-Aldrich, Acros, Alfa Aesar, EMD Millipore, and other commercial suppliers and used as received without further purification. Referring back to FIG. 5, a detailed discussion of eGNR synthesis according to an embodiment is now provided.

Synthesis of 1,3-dibromo-2-iodobenzene (4)

2,6-dibromoaniline (5.0 g, 19.9 mmol) was suspended in a mixture of water (30 mL) and concentrated hydrochloric acid (15 mL) and was cooled down to 0° C. Sodium nitrite (1.7 g, 23.9 mmol) dissolved in water (10 mL) was added dropwise to the suspension. After one hour, potassium iodide (13.2 g, 79.7 mmol) dissolved in water (30 mL) was added dropwise to the solution. The reaction was stirred for two hours at 0° C. before dichloromethane (30 mL) was added. The reaction was stirred for four hours at room temperature before it was quenched with an aqueous solution of sodium thiosulfate. The reaction was extracted with dichloromethane, dried over anhydrous magnesium sulfate, and evaporated. Purification by silica gel column chromatography (eluent: hexane) gave the title compound as a white solid (5.42 g, 75.2% yield): $^1$H NMR (700 MHz, $CDCl_3$): δ=7.54 (d, 2H), 7.06; (t, 1H); $^{13}$C NMR (175 MHz, $CDCl_3$): δ=131.4, 131.2, 130.4, 109.5.

Synthesis of 3'-bromo-1,1':2',1''-terphenyl (5)

Solvent system of toluene (60 mL) and water (6 mL) was degassed by nitrogen bubbling for fifteen minutes. 1,3-dibromo-2-iodobenzene (4) (5.42 g, 15.0 mmol), phenylboronic acid (4.02 g, 33.0 mmol), palladium(II) acetate (0.168 g, 0.75 mmol), triphenylphosphine (0.39 g, 1.50 mmol), and potassium carbonate (8.29 g, 60.0 mmol) were added sequentially. The reaction was heated to reflux and stirred under nitrogen for sixteen hours. After the reaction was allowed to cool to room temperature, it was extracted three times with dichloromethane, dried over anhydrous magnesium sulfate, and evaporated. Purification by silica gel column chromatography (eluent: hexane) gave the title compound as a white solid (3.62 g, 78.0% yield): $^1$H NMR (700 MHz, $CDCl_3$): δ=7.74; (d, 1H), 7.42; (d, 1H), 7.32-7.26; (m, 4H), 7.18-7.15; (m, 5H), 7.10; (d, 2H); $^{13}$C NMR (175 MHz, $CDCl_3$): δ=143.7, 141.2, 141.1, 140.2, 131.9, 130.7, 129.7, 129.4, 128.8, 127.8, 127.7, 127.2, 126.7, 124.7.

Synthesis of 3'-iodo-1,1':2',1''-terphenyl (6)

Due to low reactivity towards Sonogashira coupling, a halogen exchange was performed. 3'-bromo-1,1':2',1''-terphenyl (5) (2.0 g, 6.47 mmol) was dissolved in anhydrous tetrahydrofuran (20 mL) and cooled to −78° C. n-Butyllithium (2.5 M in hexanes) (3.10 mL, 7.76 mmol) was added dropwise. The reaction was stirred at −78° C. for two hours and stirred at room temperature overnight. After cooling the reaction down to −78° C., iodine (2.46 g, 9.71 mmol) dissolved in anhydrous tetrahydrofuran (15 mL) was added dropwise. The reaction was stirred at −78° C. for two hours and four hours at room temperature before it was quenched by addition of aqueous sodium thiosulfate. The reaction was extracted with dichloromethane, washed with water, dried over anhydrous magnesium sulfate, and evaporated. Purification by silica gel column chromatography (eluent: hexane) gave a mixture of the title compound and small amount of the starting material as a white solid (1.61 g). Due to very similar Rf values in hexane, separation was not achieved. The mixture was used as-is for the next step.

Synthesis of ([1,1':2',1''-terphenyl]-3'-ylethynyl) trimethylsilane (7)

Triethylamine (25 mL) was degassed with nitrogen bubbling for fifteen minutes. 3'-iodo-1,1':2',1''-terphenyl (6) (1.61 g, 4.52 mmol), bis(triphenylphosphine)palladium(II) dichloride (0.159 g, 0.226 mmol), copper(I) iodide (43.0 mg, 0.226 mmol), triphenylphosphine (0.119 g, 0.452 mmol) were added sequentially. Trimethylsilylacetylene (0.960 mL, 6.78 mmol) was added added last and the reaction was stirred under nitrogen overnight. Ethyl acetate was added to the reaction, the solid was filtered, and the filtrate evaporated. Purification by silica gel column chromatography (eluent: 10% dichloromethane/hexane) gave the title compound as a white solid (1.32 g, 89.4% yield): $^1$H NMR (400 MHz, CDCl$_3$): δ=7.60 (dd, 1H), 7.42-7.35; (m, 2H), 7.21-7.17; (m, 8H), 7.11-7.08; (m, 2H); $^{13}$C NMR (100 MHz, CDCl$_3$): δ=143.6, 141.6, 141.3, 139.4, 131.7, 130.9, 130.7, 129.9, 127.8, 127.4, 127.2, 126.7, 126.6, 123.6, 104.9, 97.9, 0.05.

Synthesis of 3'-ethynyl-1,1':2',1''-terphenyl (8)

([1,1':2',1''-terphenyl]-3'-ylethynyl)trimethylsilane (7) (1.32 g, 4.04 mmol) was dissolved in methanol (25 mL). Potassium carbonate (1.12 g, 8.09 mmol) was added and the reaction was stirred at room temperature and monitored by TLC. After three hours, the reaction was extracted with dichloromethane, washed with water, dried over anhydrous magnesium sulfate, and evaporated to give the title compound as an off-white solid (0.983 g, 95.6% yield).

5,10-dibromo-1,3-diphenyl-2H-cyclopenta[1] phenanthren-2-one (9)

The synthesis of this compound can be found in Vo, T. H.; Shekhirev, M.; Kunkel, D. A.; Morton, M. D.; Berglund, E.; Kong, L. M.; Wilson, P. M.; Dowben, P. A.; Enders, A.; Sinitskii, A., Large-Scale Solution Synthesis of Narrow Graphene Nanoribbons. Nat. Commun. 2014, 5, 3189.

Synthesis of 2-([1,1':2',1''-terphenyl]-3'-yl)-6,11-dibromo-1,4-diphenyltriphenylene (1)

To a mixture of 5,10-dibromo-1,3-diphenyl-2H-cyclopenta[1]phenanthren-2-one (9) (2.51 g, 4.64 mmol) and 3'-ethynyl-1,1':2',1''-terphenyl (8) (0.983 g, 3.87 mmol) was added diphenyl ether (2 mL). The reaction was heated to reflux and stirred overnight. Reaction progress was monitored with TLC. After the reaction was allowed to cool to room temperature, it was diluted with dichloromethane and dried under vacuum. Purification by silica gel column chromatography (eluent: 5% ethyl acetate/hexane) gave the title compound as an off-white solid (1.88 g, 63.4% yield): $^1$H NMR (700 MHz, CDCl$_3$): δ=8.17; (dd, 2H), 7.79; (d, 1H), 7.69; (d, 1H), 7.54-7.39; (m, 12H), 7.29-7.19; (m, 4H), 7.13-7.09; (m, 4H), 7.04-6.89; (m 4H), see FIG. 6; $^{13}$C NMR (175 MHz, CDCl$_3$): δ=143.4, 141.9, 141.6, 141.1, 140.6, 140.3, 139.3, 138.3, 137.7, 137.1, 134.5, 134.4, 133.1, 132.5, 132.4, 131.6, 131.0, 130.9, 129.8, 129.7, 129.6, 129.4, 129.3, 129.2, 128.9, 128.5, 127.7, 127.5, 126.9, 126.6, 126.0, 125.7, 124.5, 124.4, 119.9, 119.7, see FIG. 7. Due to the rotation barrier, not all carbons were observed.

Synthesis of Polymer (2)

Bis(1,5-cyclooctadiene)nickel(0) (0.5 g, 1.82 mmol), 2,2'-bipyridyl (0.284 g, 1.82 mmol), and 1,5-cyclooctadiene (223 μL, 1.82 mmol) were added to anhydrous dimethylformamide (6 mL). The reaction mixture was heated to 60° C. and kept for thirty minutes. Then 2-([1,1':2',1''-terphenyl]-3'-yl)-6,11-dibromo-1,4- diphenyltriphenylene (1) (0.8 g, 1.04 mmol) dissolved in anhydrous toluene (15 mL) was added to the reaction flask. The reaction was heated to 76° C. and kept for three days. After the reaction was allowed to cool to room temperature, methanol was added to precipitate the polymer. It was filtered, washed with methanol, concentrated hydrochloric acid, water, potassium hydroxide (1 M) in methanol, water, acetone, and hexane to obtain the title compound as a yellow solid (0.455 g, 71.9% yield).

Synthesis of eGNR (3)

Dichloromethane (90 mL) was degassed with nitrogen bubbling for fifteen minutes. Polymer (2) (40 mg, 65.7 μmol) and iron (III) chloride (0.45 g, 2.77 mmol) dissolved in nitromethane (5 mL) were added to the reaction mixture. The reaction was stirred for two days with nitrogen being bubbled through the reaction continuously. The reaction mixture was filtered, washed with concentrated hydrochloric acid, potassium hydroxide (1 M) in methanol, methanol, and acetone to obtain the title compound as a black solid (32 mg, 81.6% yield). $^{13}$C NMR spectra of the polymer (2) (red) and GNRs (3) are shown in FIG. 8.

Synthesis of Films of Armchair Graphene Nanoribbons

Referring back to FIGS. 9, 10A, 10B, 11A-D and 12A-F, a detailed discussion of the synthesis of films of armchair graphene nanoribbons according to an embodiment is now provided. Approximately 10 mg of perylene-3,4,9,10-tetracarboxylic dianhydride (PTCDA) powder was placed in a quartz boat and the boat was located in the center of a quartz tube furnace. A substrate of choice (e.g., copper foil, Si/SiO$_2$ wafer, mica, quartz) was placed on top of the boat face-down. The furnace was evacuated and refilled with argon to a pressure of 1 atmosphere. Then the furnace was heated to 500-600° C. for 10-120 minutes. Note: in the case of very low pressure (~5 mTorr), PTCDA sublimation occurs before the system reaches the decomposition temperature. It results in significant amount of PTCDA depositing in the cold area of the tube, but very small amount of the GNRs formed on the desired surface.

It should be appreciated that various materials that may be used for a substrate layer may include those materials mentioned herein above, and other materials such as Si, SiO$_2$, Si/SiO$_2$, glass, quartz, silicon nitride, aluminum nitride, berylium oxide, sapphire, Al$_2$O$_3$, nanoporous Al$_2$O$_3$, SiC, SiGe, SiGeC, Si alloys, Ge, Ge alloys, GaAs, InAs, InP, other III-V or II-VI semiconductors, indium tin oxide (ITO), fluorine-doped tin oxide (FTO), aluminum-doped zinc oxide (AZO), antimony-tin mixed oxide (ATO), metal carbonate, natural polymers, synthetic polymers, a metal, metal fluoride, an alkaline-earth metal fluoride, an alkali metal chloride, an alkaline-earth metal chloride, an alkali metal oxide, an alkaline-earth metal oxide, and combinations thereof.

It should be appreciated that various materials that may be used for the electrodes, e.g., anode or cathode, may include indium tin oxide (ITO), fluorine-doped tin oxide (FTO), aluminum-doped zinc oxide (AZO), antimony-tin mixed oxide (ATO), a conductive polymer, a network of metal nanowire, a network of carbon nanowire, nanotube, nanosheet, nanorod, carbon nanotube, silver nanowire, graphene, a metal, such as copper, aluminum, calcium, magnesium, lithium, sodium, potassium, strontium, cesium, barium, iron, cobalt, nickel, silver, zinc, tin, samarium, ytterbium, chromium, gold or many others, an alkali metal fluoride, an alkaline-earth metal fluoride, an alkali metal chloride, an alkaline-earth metal chloride, an alkali metal oxide, an alkaline-earth metal oxide, a metal carbonate, a metal acetate, or a combination of at least two of the above materials.

Additional information about GNRs can be found in the following articles, which are each incorporated by reference:
1) Vo, T. H.; Shekhirev, M.; Kunkel, D. A.; Morton, M. D.; Berglund, E.; Kong, L. M.; Wilson, P. M.; Dowben, P. A.; Enders, A.; Sinitskii, A., Large-Scale Solution Synthesis of Narrow Graphene Nanoribbons. Nat. Commun. 2014, 5, 3189.
2) Vo, T. H.; Shekhirev, M.; Kunkel, D. A.; Orange, F.; Guinel, M. J. F.; Enders, A.; Sinitskii, A., Bottom-up solution synthesis of narrow nitrogen-doped graphene nanoribbons. Chem. Commun. 2014, 50 (32), 4172-4174.
3) Vo, T. H.; Shekhirev, M.; Lipatov, A.; Korlacki, R. A.; Sinitskii, A., Bulk properties of solution-synthesized chevron-like graphene nanoribbons. Faraday Discussions 2014, 173 (0), 105-113.
4) Radocea, A.; Sun, T.; Vo, T. H.; Sinitskii, A.; Alum, N. R.; Lyding, J. W., Solution-Synthesized Chevron Graphene Nanoribbons Exfoliated onto H:Si(100). Nano Lett. 2017, 17 (1), 170-178.
5) Shekhirev, M.; Vo, T. H.; Mehdi Pour, M.; Lipatov, A.; Munukutla, S.; Lyding, J. W.; Sinitskii, A., Interfacial Self-Assembly of Atomically Precise Graphene Nanoribbons into Uniform Thin Films for Electronics Applications. ACS Applied Materials & Interfaces 2017, 9 (1), 693-700.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A gas sensor, comprising:
a sensing element including a substrate and a layer of carbon based nanostructures arranged on a surface of the substrate, wherein the carbon based nanostructures comprise one or more sheets of two-dimensional materials, wherein the carbon based nanostructures are arranged at angles other than 0 degrees to the surface of the substrate, and wherein intercalation of a gas analyte between the carbon based nanostructures changes a conductivity of the layer of carbon-based nanostructures.

2. The gas sensor of claim 1, wherein the carbon based nanostructures comprise graphene nanoribbons that are less than 10 nm wide.

3. A gas sensor of claim 1, wherein the carbon-based nanostructures comprise straight graphene nanoribbons.

4. A gas sensor, comprising:
a sensing element including a substrate and a layer of carbon based nanostructures arranged on a surface of the substrate, wherein the carbon based nanostructures are arranged at angles other than 0 degrees to the surface of the substrate, wherein intercalation of a gas analyte between the carbon based nanostructures changes a conductivity of the layer of carbon-based nanostructures, and wherein the carbon-based nanostructures comprise straight graphene nanoribbons with armchair edges or laterally extended graphene nanoribbons (eGNRs).

5. The gas sensor of claim 1, wherein the carbon-based nanostructures comprise laterally extended graphene nanoribbons (eGNRs) or straight graphene nanoribbons with armchair edges.

6. The gas sensor of claim 1, wherein the carbon based nanostructures comprise polycyclic aromatic hydrocarbons including naphthalene, anthracene, tetracene, pentacene, heptacene, rubrene, perylene, terrylene, quaterrylene, pyrene, phenanthrene, chrysene, triphenylene, corannulene, benzo[ghi]perylene, ovalene, coronene, or hexabenzocoronene, or combinations thereof.

7. The gas sensor of claim 1, wherein the carbon based nanostructures comprise graphene-based and graphene-related materials including graphite, graphene, graphite oxide, graphene oxide, chemically converted graphene, reduced graphene oxide, graphene quantum dots, carbon nanotubes, fullerenes, graphene nanomeshes, graphene antidote lattices, unzipped carbon nanotubes, graphene nanodiscs, nanostructured graphenes, graphene foams, or graphene scaffolds, or combinations of thereof.

8. The gas sensor of claim 1, wherein the carbon-based nanostructures comprise carbon materials in which some of the carbon atoms are substituted with heteroatoms, including N, B, S, P, or Si.

9. The gas sensor of claim 1, wherein the carbon based nanostructures are modified with functional groups that comprise at least one of anhydride groups, carboxyl groups, amine groups, phenol groups, alkyl groups, epoxy groups, amides, esters, hydroxyl groups, aryl groups, carbonyl groups, thiols, phosphonic acids, and combinations thereof.

10. The gas sensor of claim 1, further including first and second electrodes arranged on opposite ends of the substrate.

11. The gas sensor of claim 10, further including a processing element communicably coupled to the first and second electrodes and adapted to receive a sensor response signal from the first and second electrodes, wherein the sensor response signal is indicative of an amount of the gas analyte adsorbed by the layer of carbon-based nanostructures.

12. The gas sensor of claim 1, wherein the substrate comprises a material selected from the group consisting of Si, $SiO_2$, $Si/SiO_2$, glass, quartz, silicon nitride, aluminum nitride, beryllium oxide, sapphire, $Al_2O_3$, nanoporous $Al_2O_3$, SiC, SiGe, SiGeC, Si alloys, Ge, Ge alloys, GaAs, InAs, InP, other III-V or II-VI semiconductors, indium tin oxide (ITO), fluorine-doped tin oxide (FTO), aluminum-doped zinc oxide (AZO), antimony-tin mixed oxide (ATO), a metal, metal fluoride, an alkaline-earth metal fluoride, an alkali metal chloride, an alkaline-earth metal chloride, an alkali metal oxide, an alkaline-earth metal oxide, a metal carbonate, natural polymers, synthetic polymers and combinations thereof.

13. The gas sensor of claim 1, wherein the one or more sheets of two-dimensional materials include a material selected from the group consisting of graphene oxide, graphane, graphyne, borophene, germanene, silicene, stanene, phosphorene, hexagonal boron nitride, borocarbonitride, a transition metal chalcogenide, a transition metal carbide, a transition metal nitride, a transition metal carbonitride, a two-dimensional oxide, a two-dimensional metal, a two-dimensional metal-organic framework and combinations of thereof.

14. The gas sensor of claim 1, wherein the gas analyte comprises a volatile compound.

15. The gas sensor of claim 1, wherein the gas analyte comprises at least one of the alcohol molecules, including methanol, ethanol, n-propanol, isopropanol, n-butanol, 2-butanol, phenol, and combinations of thereof.

16. The gas sensor of claim 1, wherein the gas analyte comprises at least one of the volatile organonitrogen compounds, including pyridine, pyrrole, methylamine, dimethylamine, trimethylamine, ethylamine, n-butylamine, aniline, 4-methoxyaniline, N,N-dimethylaniline, 3-nitroaniline, 4-nitroaniline, 4-trifluoromethylaniline, and combinations of thereof.

17. The gas sensor of claim 1, wherein the gas analyte comprises at least one of the volatile organophosphorus compounds, including phosphine, diphosphine, trimethylphosphine, trimethoxyphosphine, trimethoxyphosphine, tryphenylphosphine, parathion, malathion, methyl parathion, chlorpyrifos, diazinon, dichlorvos, phosmet, fenitrothion, tetrachlorvinphos, azamethiphos, azinphos-methyl, methylphosphonofluoridate, ethyl dimethylphosphoramidocyanidate, 3,3-dimethylbutan-2-yl methylphosphonofluoridate, and combinations of thereof.

18. The gas sensor of claim 1, wherein the gas analyte comprises at least one of the volatile organosulfur compounds, volatile organohalogen compounds, and combinations of thereof.

19. The gas sensor of claim 1, wherein the gas analyte comprises at least one of the volatile inorganic compounds, including water, $H_2S$, $H_2Se$, $H_2Te$, boranes, $BH_3$, $B_2H_6$ and $B_3H_7$, diatomic halogens, vapors of inorganic acids and combinations of thereof.

20. The gas sensor of claim 1, wherein the substrate includes a plurality of substrate electrodes arranged in a parallel pattern on the surface of the substrate.

21. The gas sensor of claim 20, further including a plurality of first electrodes attached to one end of the plurality of substrate electrodes and a plurality of second electrodes attached to a second end of the substrate electrodes.

22. A gas sensor, comprising:
a sensing element including a substrate and a layer of carbon based nanostructures arranged on a surface of the substrate, wherein the carbon based nanostructures are arranged at angles other than 0 degrees to the surface of the substrate,
wherein a first region of the layer includes a first arrangement of the carbon based nanostructures morphologically different from a second arrangement of the carbon based nanostructures in a second region of the layer, such that intercalation of a first gas analyte between the carbon based nanostructures in the first region changes a conductivity of the layer of carbon-based nanostructures in the first region by a greater amount than intercalation of a second gas analyte between the carbon based nanostructures in the first region, and such that intercalation of the second gas analyte between the carbon based nanostructures in the second region changes a conductivity of the layer of carbon-based nanostructures in the second region by a greater amount than intercalation of the first gas analyte between the carbon based nanostructures in the second region.

23. A gas sensor, comprising:
a first sensing element including a first substrate and a first layer of carbon based nanostructures arranged on a surface of the first substrate, wherein the first layer of carbon based nanostructures are arranged at angles other than 0 degrees to the surface of the first substrate,
a second sensing element including a second substrate and a second layer of carbon based nanostructures arranged on a surface of the second substrate, wherein the second layer of carbon based nanostructures are arranged at angles other than 0 degrees to the surface of the second substrate,
wherein the first layer of carbon based nanostructures are morphologically different than the second layer of carbon based nanostructures such that intercalation of a first gas analyte between the carbon based nanostructures in the first sensing element changes a conductivity of the first layer of carbon-based nanostructures in the first sensing element by a greater amount than intercalation of a second gas analyte between the carbon based nanostructures in the first sensing element, and such that intercalation of the second gas analyte between the carbon based nanostructures in the second sensing element changes a conductivity of the second layer of carbon-based nanostructures in the second sensing element by a greater amount than intercalation of the first gas analyte between the carbon based nanostructures in the second sensing element.

24. The gas sensor of claim 13, wherein the transition metal chalcogenide includes one of $MoS_2$, $WS_2$, $MoSe_2$, $WSe_2$, $MoTe_2$, $WTe_2$, $ReS_2$, $ReSe_2$, $PtSe_2$, $PtSe_2$, $TiS_2$, $TiS_3$, $TiSe_3$, $TiTe_3$, $ZrS_2$, $ZrS_3$, $ZrSe_3$, $ZrTe_3$, $HfS_2$, $HfS_3$, $HfSe_3$, and $HfTe_3$.

* * * * *